United States Patent
Fish et al.

(10) Patent No.: US 6,381,693 B2
(45) Date of Patent: *Apr. 30, 2002

(54) ARRANGEMENTS HAVING FIRMWARE SUPPORT FOR DIFFERENT PROCESSOR TYPES

(75) Inventors: Andrew J. Fish; William J. Clem, both of Olympia, WA (US)

(73) Assignee: Intel Corp., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,809

(22) Filed: Dec. 31, 1998

(51) Int. Cl.$^7$ .............................................. G06F 9/445
(52) U.S. Cl. .............................................. 713/1; 713/2
(58) Field of Search ........................... 713/1, 2; 717/5, 717/6, 11, 9; 711/163; 709/311

(56) References Cited

U.S. PATENT DOCUMENTS

| | | | | |
|---|---|---|---|---|
| 4,328,542 A | * | 5/1982 | Anastas et al. | 711/163 |
| 5,313,584 A | | 5/1994 | Tickner et al. | 710/37 |
| 5,604,905 A | * | 2/1997 | Tevanian et al. | 717/6 |
| 5,752,032 A | * | 5/1998 | Keller et al. | 709/311 |
| 5,805,902 A | | 9/1998 | Kikinis et al. | 710/261 |
| 5,832,280 A | | 11/1998 | Swanberg | 713/300 |
| 5,835,704 A | * | 11/1998 | Li et al. | 714/42 |
| 5,835,775 A | * | 11/1998 | Washington et al. | 717/6 |
| 5,938,765 A | * | 8/1999 | Dove et al. | 713/1 |
| 5,943,673 A | | 8/1999 | Felouzis et al. | 707/104 |
| 5,958,049 A | | 9/1999 | Mealey et al. | 713/1 |
| 6,049,668 A | * | 4/2000 | Smith et al. | 717/5 |
| 6,065,067 A | | 5/2000 | Hobson et al. | 710/8 |
| 6,081,890 A | * | 6/2000 | Datta | 713/1 |

OTHER PUBLICATIONS

Harvey M. Deitel, "An Introduction to Operating Systems," Addision–Wesley Publishing Company, Inc., First Edition, p. 5, lines 15–19 (No Publ. Date Avail.).

* cited by examiner

Primary Examiner—Zarni Maung
Assistant Examiner—Jungwon Chang
(74) Attorney, Agent, or Firm—Antonelli, Terry, Stout & Kraus, LLP

(57) ABSTRACT

A system, a method of operating the system and a system firmware. The system includes a processor and a system firmware including a plurality of customized firmware parts, with each firmware part performing system firmware functions required for and customized to only a subset of a plurality of types of processors which are operational when connected to the system, and a processor identification device, coupled to the system, which identifies which subset of the plurality of types of processors is connected to the system and in response to the identification of the type of connected processor, causes a customized firmware part corresponding to the identified types of processor to be executed by the processor.

22 Claims, 4 Drawing Sheets

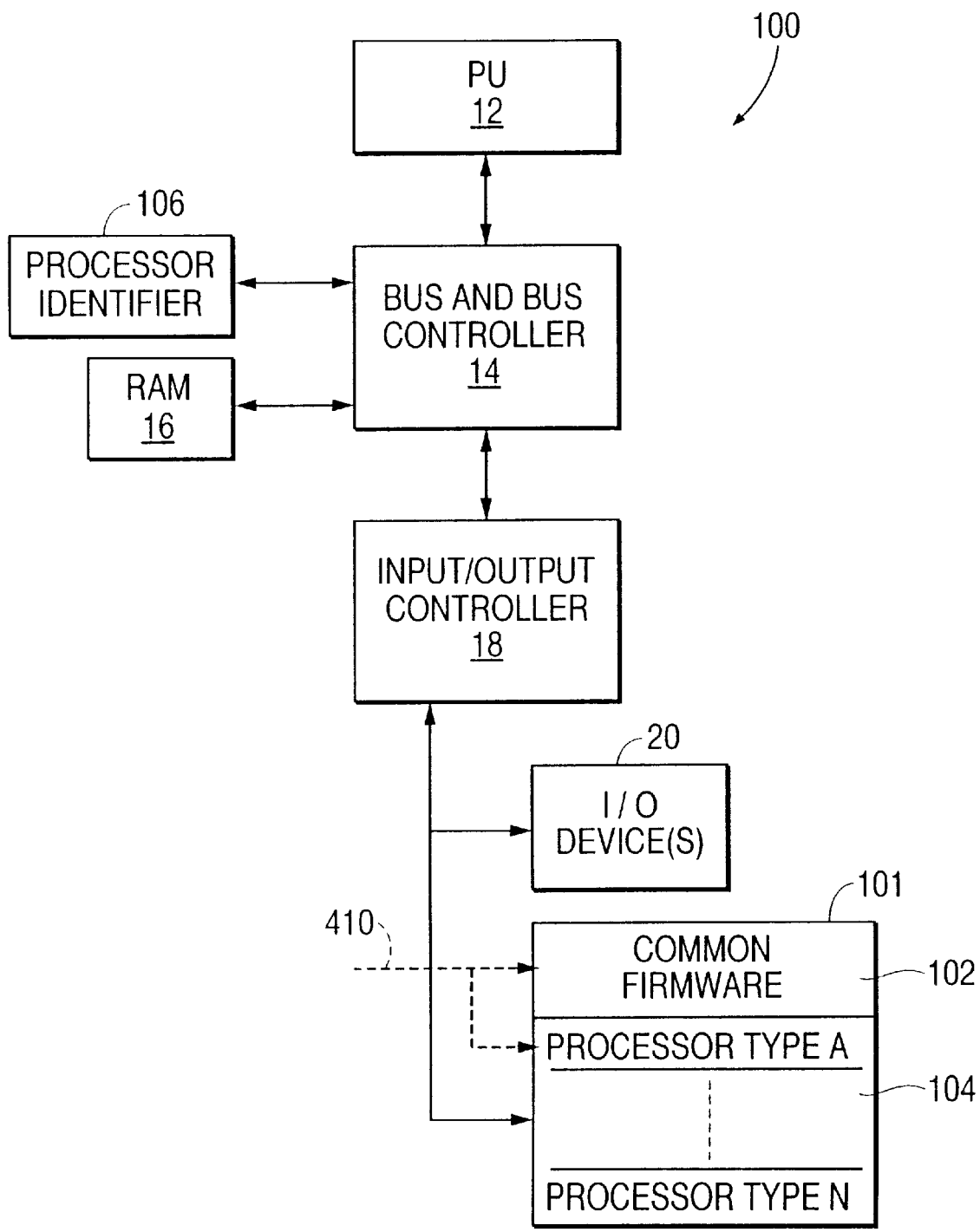

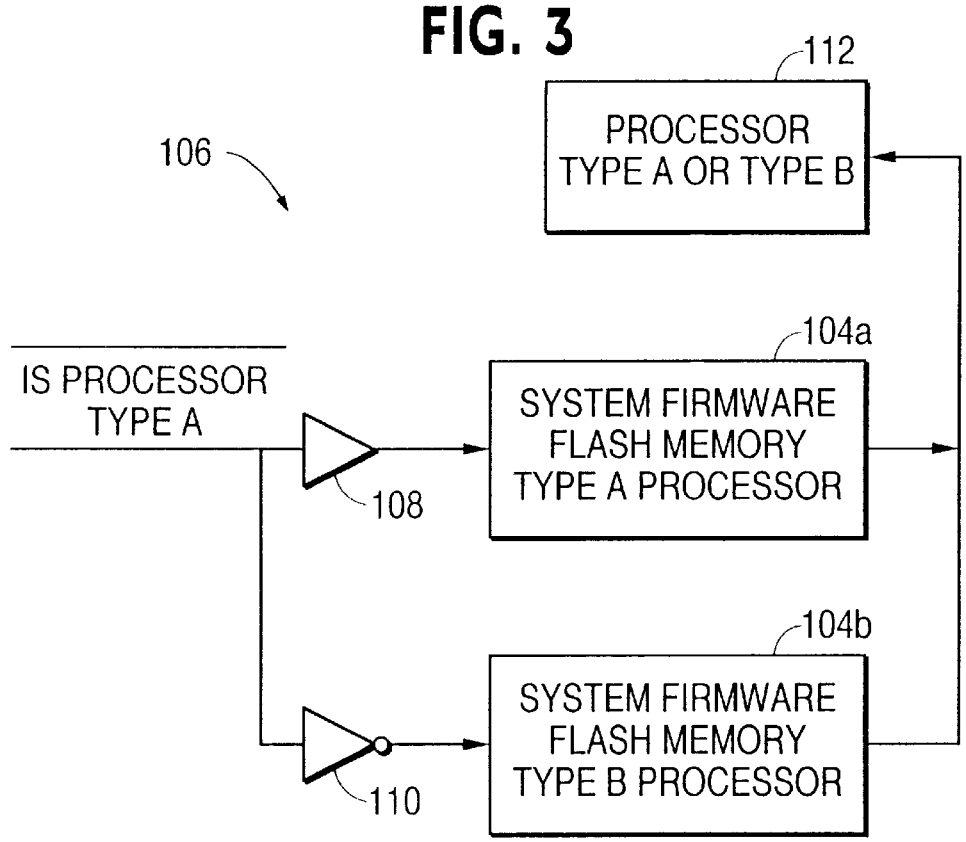

ARRANGEMENTS HAVING FIRMWARE SUPPORT FOR DIFFERENT PROCESSOR TYPES

FIELD

The present invention relates to arrangements to allow processing systems to be operable with different processors needing differing system firmware.

BACKGROUND

Firmware typically is hardware specific and must completely match hardware installed within a particular system. However, it has been found that, occasionally, there may be times where it is advantageous to change and/or add hardware within a system. Any change in hardware in the system typically requires a corresponding change of firmware. Previously, upgrading of firmware required obtaining and then physically replacing at least one semiconductor chip. Some newer systems have disk-loaded firmware that is somewhat easier/cheaper to upgrade (e.g., can be downloaded from the Internet). However, such updating procedures may still be too confusing and/or cumbersome to an average user.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure hereof this invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the appended claims.

The following represents brief descriptions of the drawings, wherein:

FIG. 2 illustrates an example block diagram of an example processing system embodiment in accordance with the present invention;

FIG. 3 illustrates an example block diagram of an example embodiment of the present invention;

FIG. 4 illustrates an example cross-reference table useable with an embodiment of the present invention.

DETAILED DESCRIPTION

Figure 1:
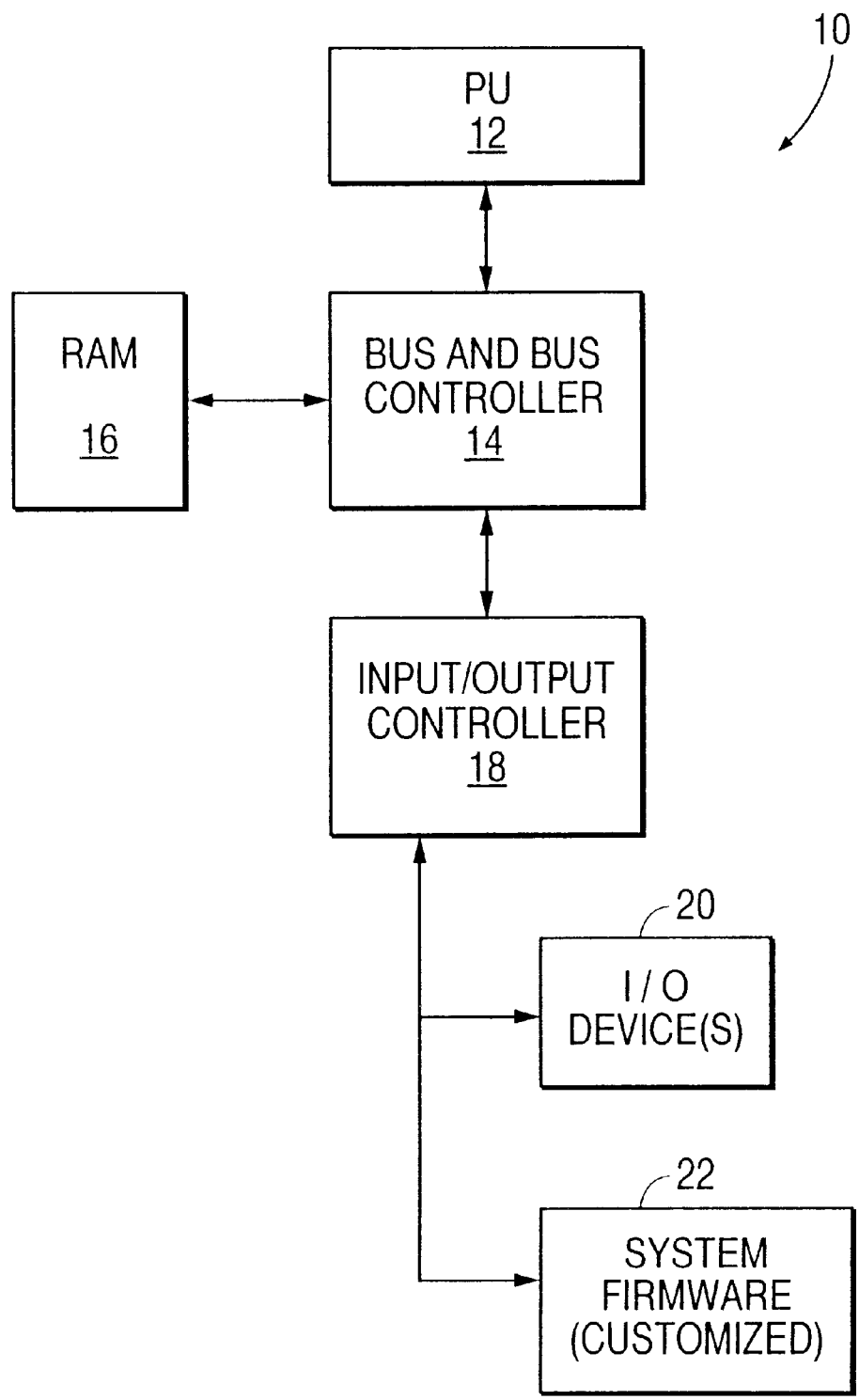
FIG. 1 illustrates an example block diagram of an example processing system for background discussion.

Before beginning a detailed description of embodiments of the subject invention, mention of the following is in order. When appropriate, like reference numerals and characters are used to designate identical, corresponding or similar components in differing figure drawings. Further, in the detailed description to follow, although exemplary components are given, the present invention is not limited to the same. Next, known power connections and/or other connections (e.g., signal lines) are not shown within the FIGS. for simplicity of illustration and discussion, as so as not to obscure the invention. Still further, while example embodiments of the present invention are described with respect to a processor change, the present invention is not limited to use with such processor change. More particularly, embodiments of the present invention may be used with respect to modification of differing arrangements within a processing system. Finally, as used herein, the terminology "firmware" includes any stored code in the processing system which is used for controlling functions of the processing system, with firmware including, but not being limited to, a basic input/output system (BIOS).

Turning now to detailed discussion, FIG. 1 illustrates an example block diagram of an example processing system 10, useful in describing background disadvantages before discussion of example embodiments of the invention. The example system includes a processor unit (PU) 12 which may be any processor, with such PU 12 being coupled to a bus and bus controller 14 of any design. Random access memory (RAM) 16 is coupled to the bus and bus controller 14. An I/O controller 18 is coupled to the bus and bus controller 14, and to at least one I/O device 20. The system 10 includes system firmware 22 which is customized to work with the architectures of the system, e.g., with the PU 12, I/O controller 18 and I/O device(s) 20 for operation of the processing system.

In the FIG. 1 example, differing types of PUs may be implemented as the PU 12, resulting in many diverse possible configurations. For purposes of this disclosure, differing types of processors will be generically referred to using alphabetical tags or designations, such as type A processor, type B processor . . . type N processor. However, embodiments of the present invention are not limited to alphabetical designation, e.g., embodiments of the present invention could just as easily be implemented using numeric and/or alpha-numeric tags or designations, such as differing processor part or model numbers.

Newly purchased systems typically do not have a system firmware problem, i.e., because newly purchased systems typically come with a predetermined hardware configuration (including a predetermined PU), and have system firmware uniquely written (i.e., customized) to the predetermined hardware configuration. However, any subsequent hardware (e.g., PU) change or addition resulting in configuration modification may cause the system firmware to need to be correspondingly updated in order to keep the processing system operating properly. As one example, a problem may exist where differing types of processors are exchanged (e.g., upgradeable) within a particular processing system configuration. Although the present invention is not limited thereto, one upgrade example might be a processor of a 64-bit architecture being substituted for a processor of a 32-bit architecture on a motherboard.

One example problem which might exist, is that the address maps of the system firmware or BIOS firmware for a replaced (i.e., old) PU may not work with a replacement (i.e., new) PU, i.e., such address maps may conflict. More specifically, firmware for respective processor types typically are specific to each processor, and typically cannot be used to run a different processor type.

Problems such as this can only be solved via some type of firmware adjustment, e.g., by physical replacement of the firmware or updating thereof. However, as mentioned previously, replacement or updating of system firmware may be too expensive, too confusing and/or cumbersome to an average user, and often results in substantial problems/delays in getting a processing system to work properly again after even slight modification. Such problems/delays are at the very least inconvenient, and are more probably very disruptive and costly, especially in a business environment.

As a result of such disadvantages, it is desirable for hardware manufacturers, e.g., manufacturers of PU 12, to avoid having installation of their devices (e.g., component upgrading) require substantial user work in updating system firmware 22. What would be ideal is an arrangement adapted to allow a hardware component (e.g., PU 12) modification, without requiring a user to perform a corresponding firmware modification. FIG. 2 illustrates an example embodiment of an example processing system 100 in accordance with the present invention, which mitigates or obviates user work in updating firmware. The bus and bus controller 14, RAM 16, I/O controller 18, and I/O device(s) 20, may be the same as those of FIG. 1, and accordingly redundant description thereof is omitted herein for sake of brevity. Instead, discussion turns to a first example firmware and/or I/O hardware arrangement useable in the example embodiment of the present invention.

More particularly, in practice, if a number of differing hardware configurations (e.g., differing PUs 12) were applied to the FIG. 2 embodiment, some firmware portions may be mutually useable in common for all (or for at least a substantial portion of) the differing configurations, while other respective firmware portions may each be customized for use with one or several of the respective differing configurations (while not being used with others). Accordingly, FIG. 2 contains an example embodiment of a system firmware 101, having a modular firmware layout which accommodates (i.e., provides) both common firmware portions and customized firmware portions in differing accessible areas. More particularly, area 102 stores common firmware portions, whereas area 104 stores a plurality of customized firmware portions for a plurality of hardware types.

For example, area 104 may contain a custom processor type A firmware portion which supports functionality/operation of a processor type A, custom processor type B firmware portion which supports functionality/operation of processor type B, . . . and custom processor type N firmware portion which supports functionality/operation of a processor type N. There typically may be as many custom processor type firmware portions as there are possible types of processors which may be utilized as the PU 12. Each customized firmware portion may be provided in a differing sub-area of the area 104, and may be accessed and executed separately from all of the other customized firmware portions, or may be accessed and executed in conjunction with other ones of the customized firmware portions. Again, embodiments of the present invention are not limited in that N can be of any number of custom firmware portions, while available storage capacity size allotted to the firmware may pose some limitation.

The firmware, which is coupled to the I/O controller, may be stored in a storage device of the non-volatile type such as a FLASH memory, but embodiments of the present invention are not limited thereto. Instead the firmware may alternatively be stored in a read-only memory (ROM), non-volatile RAM (NVRAM), hard-disk (HD), etc. Further, the system firmware may at least partially include a basic I/O system (BIOS). Still further, while the firmware in the FIG. 2 example embodiment is illustrated as being coupled to the I/O controller 18, such firmware may alternatively be coupled to any one of a plurality of other possible addressable locations in the system architecture. More particularly, the possible locations are any address in the address space of the system.

Turning now to further elaboration of the firmware 101, the common firmware portions within area 102 may be accessed and executed upon every system initialization (e.g., before access/execution of any customized firmware portions), irrespective of which type of PU 12 is installed within the system configuration. In contrast, only a selected one or ones of the customized firmware portions within area 104 may be executed upon system initialization (e.g., after access/execution of the common firmware portions).

More specifically, embodiments of the present invention have arrangements (e.g., operations instructed by execution of the common firmware portions) which determine (e.g., during initialization) which particular type of PU 12 is installed within the system configuration, and which utilize such information to access and execute the one or ones of the customized firmware portions corresponding to (i.e., required for use with) the type of PU 12 installed in the system. More specifically, if the installed PU 12 is a processor type B, then a custom processor type B firmware portion would be accessed and executed during system initialization.

An embodiment of the present invention has firmware arrangements allowing it to be configurable with any one of a plurality of different processors, with each of the different processors using a system firmware which is customized relative to the system firmware of other ones of the plurality of different processor types. The invention permits different processor types each having customized system firmware to be substituted in the hardware platform without manual changing of the system firmware. The term customized firmware portions should not be taken as firmware having programming necessarily mutually exclusive of other firmware, but instead, differing customized firmware portions may contain some similar portions of programming and/or may provide similar operations and/or functions.

In continuing discussion, embodiments of the invention have an arrangement(s) to identify (e.g., upon initialization) the type of processor which is installed in the processing system configuration. More particularly, the FIG. 2 example embodiment further illustrates an example processor identifier 106 which may perform one or more processes for identifying the installed PU 12. While the example processor identifier 106 is illustrated as being coupled to the bus controller 14, such identifier may instead be coupled to the system in any one of a plurality of different locations. Further, the processor identifier 106 may be either hardware or software implemented.

During initialization, for example, execution of the common firmware portions by the PU 12 may cause the processor identifier 106 to determine identification of the PU 12. As a non-exhaustive list of possible processes, processor identifier 12 may: have a sensor to sense physical presence of pins or structures unique to differing PUs 12; sense a voltage, current or signal unique to differing PUs 12; optically sense some type of predetermined indicia identifying particular PUs 12; read an identification of the PU type stored in processing system; read a message transmitted on the bus of the bus and bus controller 14; identify a protocol used by the bus of the bus and bus controller 14; determine if a predetermined signal is present or absent in the system; and analyze at least one signal to identify a predetermined signal pattern in the at least one signal customized to the processor type. Practice of embodiments of the present invention is not limited in any way to any particular process for identifying the processor, and the above examples are in no way exhaustive.

Embodiments of the present invention use such resultant (i.e., determined) identification to dynamically (i.e., upon reset or initialization of the system) activate (in addition to the generic common firmware) one or more corresponding ones of the customized firmware portions. More particularly, the processor identifier 106 may additionally have the FIG. 4 cross-reference table 400 for using the identification to determine which one(s) of the custom firmware portions should be executed for each differing type of possible I/O devices. More particularly, the FIG. 4 example illustrates a Cross-Reference Table 400 having entries designating differing possible types of PUs 12 in a "PU Type" column, and further pointer entries (e.g., unique IDs or addresses) designating corresponding firmware portions which should be accessed/executed in a "Pointer(s)" column.

Note that for an installed processor type A, the pointers (represented figuratively by the FIG. 4 dashed oval 410 and the FIG. 2 long/short dashed arrows 410) indicate that the common firmware portions and custom processor type A firmware portions should be accessed and executed. For an installed processor type N, the pointers indicate that the common firmware portions and both the custom processor type A and N firmware portions should be accessed and executed. Note that the type N example shows that multiple custom firmware portions may be accessed and executed for some types of PUs 12. More particularly, the type N example shows that the custom processor type firmware portions are not limited for use only with their own designated type of PUs 12.

The FIG. 2 example embodiment is advantageous in that it allows Cross-Reference Table 400 and/or firmware 101 components to be mass produced and/or generically programmed with common firmware portions, custom firmware portions, PU types and/or pointer(s) to versatilely accommodate all presently known (e.g., as of the date of manufacture) hardware components (e.g., PUs 12). Further, if such components are provided as one or more FLASH memory components, such can be arranged to be easily reprogrammed to upgrade (e.g., via an internet or disk-loaded firmware download).

The table 400 and/or firmware 101 may also provide additional optional information which is used by the system 100 during operation of the PU 12 which is accessed when the system is reset. The additional information may be of diverse types and provide a mechanism for supporting different types of system operation as follows. The additional information: may relate to a chipset used by the I/O controller 18 which is used by the PU 12 during operation of the system 100; may be code used by the system 100 during operation of the PU 12 or code used by the bus controller 18; may encode system responses to system state changes, such as, but not limited to, the system stopping or continuing upon error conditions. Such additional information examples are in no way exhaustive.

Discussion turns next to FIG. 3 which illustrates another example embodiment of the present invention. More particularly, whereas the FIG. 2 firmware arrangements used a Cross-Reference Table 400, pointers and singular firmware component 101, the FIG. 3 firmware arrangement has separate firmware components 104a and 104b, and a logical gate arrangement to supply an activating power or signal to only one of the firmware components 104a and 104b. That is, the identification from the processor identifier 106 is subjected to the inverse question "IS PROCESSOR TYPE A" loaded, and logical gates 108 and 110 convert the results of such query oppositely to one another. The opposite outputs from the logical gates 108 and 110 are used to either supply power to, or otherwise only activate one of, the separate firmware components 104a and 104b.

More particularly, the system 106 is arranged such that if a processor type A is installed in the processor 112 within the processing system, the firmware component 104a containing the system firmware for the type A processor is activated to provide firmware code to the processor 112, while the firmware component 104b is deactivated. In contrast, if a processor type B is installed in the processor 112 within the processing system, the firmware component 104b containing the system firmware for the type B processor is activated to provide firmware code to the processor 112, while the firmware component 104a is deactivated.

Figure 5:
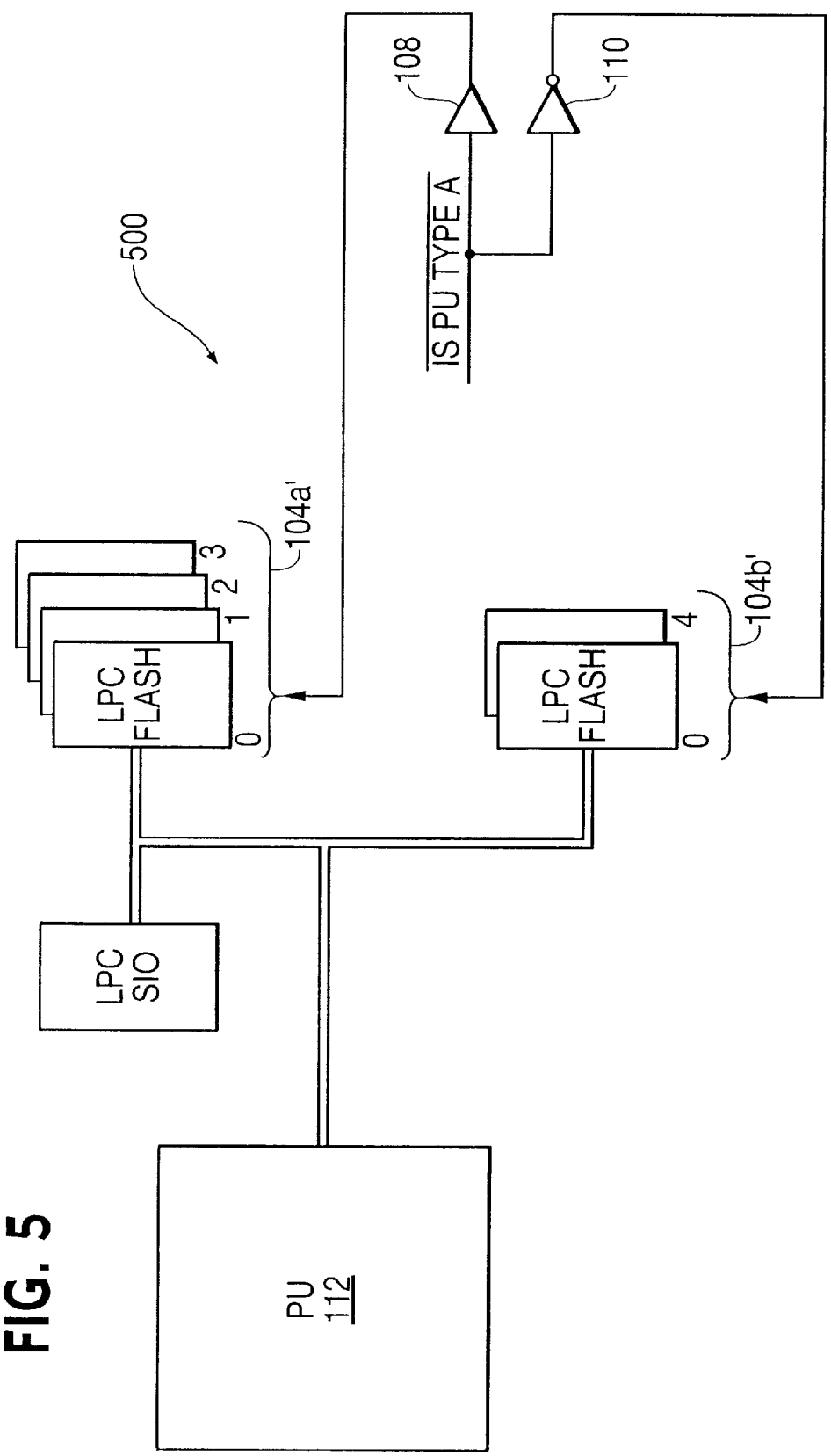
FIG. 5 illustrates another example block diagram of an example embodiment of the present invention.

FIG. 5 is similar to FIG. 3, except that the FIG. 5 system 500 shows firmware components 104a' and 104b' which each include an assembly of separate firmware components. More particularly, the firmware component 104a' is illustrated as including a plurality (e.g., four) low pin count (LPC) FLASH memories 0, 1, 2, 3. In contrast, the firmware component 104b' is illustrated as including a plurality (e.g., two) LPC FLASH memories 0, 4. The FLASH memories 0 in common with both firmware components 104a' and 104b' are again indicative of the fact that differing PU's 112, may utilize some firmware portions in common. FIG. 5 further shows an LPC super input/output (SIO) component.

For sake of brevity and clarity of illustration and discussion, the FIGS. 3 and 5 example embodiments were illustrated as having only two firmware components 104a and 104b for supporting two differing PUs. However, embodiments of the present invention are in no way limited to supporting only two different PUs, or in fact any number of differing PUs. However, the prohibitive cost of a large number of firmware components (i.e., storages), and/or scarcity of space within a processing system, may represent some limitation.

In addition to the embodiments of the present invention being useful in situations wherein a processor modification is made some time after purchase, a universal or standard firmware which versatilely supports installation of different processors would permit hardware platforms to be assembled without requiring firmware change. Further, embodiments of the present invention are applicable to not only personal computers (PCs), but to other processing systems such as servers.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A system operable with any of a plurality of different types of processors comprising:

a processor;

a system firmware including a common firmware part and a plurality of customized firmware parts;

the common firmware part providing at least one system firmware function mutually used in common for different types of processors;

each customized firmware part providing at least one system firmware function used for and customized to a subset of the plurality of different types of processors;

wherein the common firmware part executes upon system initialization; and a processor identifier device, coupled to the system, which identifies which of the plurality of processor types is connected to the system, and in response to the identification of a connected processor type, causes the customized firmware part pertaining to an identified processor type to be executed by the processor, wherein only selected ones of the customized firmware parts executes upon system initialization.

2. A system in accordance with claim 1 wherein:

the processor identifier device identifies the processor type by detecting if one of a particular pin and a predetermined physical trait on an integrated circuit of the processor type is present or absent.

3. A system in accordance with claim 2 wherein:

the processor identifier device identifies the processor type upon initialization of the system.

4. A system in accordance with claim 1 wherein: the processor identifier device identifies the processor type by determining if a predetermined signal is present or absent.

5. A system in accordance with claim 4 wherein:

the processor identifier device identifies the processor type upon initialization of the system.

6. A system in accordance with claim 1 wherein:

the processor identifier device identifies the processor type by analyzing at least one signal to identify a predetermined signal pattern in the at least one signal, the predetermined signal pattern being customized to the processor type.

7. A system in accordance with claim 1 wherein:

the processor identifier device identifies the processor type by reading an identification of the processor which is stored in the system.

8. A system in accordance with claim 1 further comprising:

a bus coupled to the processor, and wherein the processor identifier device identifies the processor type by reading a message transmitted on the bus.

9. A system in accordance with claim 1 further comprising:

a bus coupled to the processor; and wherein the processor identifier device identifies the processor type by identifying a protocol used by the bus.

10. A system in accordance with claim 1 wherein:

the processor identifier device identifies the processor type upon initialization of the system.

11. A method of operating a system with any of a plurality of processor types, each of the processor types using a system firmware which is customized with system firmware providing system firmware functions used for and customized to that type of processor, said method comprising:

providing a system firmware in the system including a common firmware part and a plurality of customized firmware parts, wherein the common firmware part provides at least one system firmware function mutually used in common for different types of processors and the common firmware part executes upon system initialization, wherein each customized firmware part performs at least one system firmware function used for and customized to a subset of the plurality of different types of processors which are operational when connected to the system;

providing an arrangement to identify which subset of the plurality of processors is connected to the system; and providing an arrangement to use, in response to the identification of the connected different types of processors, the identification of the processor to select the customized firmware part of the system firmware to operate the system for the identified type of processor connected to the system, wherein only selected ones of the customized firmware parts executes upon system initialization.

12. A method in accordance with claim 11, wherein:

the type of processor is identified by detecting if a particular pin on an integrated circuit of the processor is present or absent.

13. A method in accordance with claim 12 wherein:

the type of processor is identified upon initialization of the system.

14. A method in accordance with claim 11 wherein:

the type of processor is identified by determining if a predetermined signal is present or absent.

15. A method in accordance with claim 11 wherein:

the type of processor is identified by analyzing at least one signal to identify a predetermined signal pattern in the at least one signal, the predetermined signal pattern being customized to the type of processor.

16. A method in accordance with claim 11 wherein:

the type of processor is identified by reading an identification of the processor which is stored in the processor.

17. A method in accordance with claim 11 wherein:

a bus is coupled to the processor; and the type of processor is identified by reading a message transmitted on the bus.

18. A method in accordance with claim 11 wherein:

a bus is coupled to the processor; and the type of processor is identified by identifying a protocol used by the bus.

19. A method in accordance with claim 11 wherein:

the type of processor is identified upon initialization of the system.

20. A system firmware for use in a processing system which is operational with a subset of a group of processor types each operating with system firmware which is customized to that type of processor, comprising:

a plurality of code sections which collectively contain the system firmware for all of the processor types, and each code section containing system firmware code for performing system firmware functions of a subset of the group of processors which is customized to the subset of the group of processor types.

21. A system operable with any of a plurality of different types of processors comprising:

a processor;

a system firmware including a common firmware part and a plurality of customized firmware parts;

the common firmware part providing at least one system firmware function mutually used in common for different types of processors;

each customized firmware part providing at least one system firmware function used for and customized to a subset of the plurality of different types of processors;

wherein the common firmware part executes upon system initialization; and a processor identifier device, coupled to the system, which identifies which of the plurality of processor types is connected to the system, and in response to the identification of a connected processor type, causes the customized firmware part pertaining to an identified processor type to be executed by the processor, wherein only selected ones of the customized firmware parts execute upon system initialization.

22. A system operable with any of a plurality of different types of processors comprising:

at least one processor, with all processors of the system being of a common processor type;

a system firmware including a common firmware part and a plurality of customized firmware parts;

the common firmware part providing at least one system firmware function mutually used in common for different types of processors;

each customized firmware part providing at least one system firmware function used for and customized to a subset of the plurality of different types of processors;

wherein the common firmware part executes upon system initialization; and a processor identifier device, coupled to the system, which identifies which processor type of the plurality of processor types is connected to the system, and in response to the identification of a connected processor type, causes the customized firmware part pertaining to an identified processor type to be executed by the processor, wherein only selected ones of the customized firmware parts executes upon system initialization.

* * * * *